United States Patent
Fu et al.

(10) Patent No.: US 10,222,489 B2
(45) Date of Patent: Mar. 5, 2019

(54) PIXEL-DESIGN FOR USE IN A RADIATION DETECTOR

(71) Applicant: General Electric Company, Schenectady, NY (US)

(72) Inventors: Geng Fu, Rexford, NY (US); Xue Rui, Clifton Park, NY (US); Yannan Jin, Schenectady, NY (US); Jianjun Guo, Ballston Spa, NY (US); Peter Michael Edic, Albany, NY (US); Brian David Yanoff, Schenectady, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 15/457,558

(22) Filed: Mar. 13, 2017

(65) Prior Publication Data

US 2018/0259657 A1   Sep. 13, 2018

(51) Int. Cl.
*G01T 1/24* (2006.01)
*G01T 1/36* (2006.01)
*G01T 7/00* (2006.01)

(52) U.S. Cl.
CPC ............ *G01T 1/247* (2013.01); *G01T 1/241* (2013.01); *G01T 1/366* (2013.01); *G01T 7/005* (2013.01)

(58) Field of Classification Search
CPC ......... G01T 1/247; G01T 7/005; G01T 1/366; G01T 1/241
USPC .................................................... 250/370.09
See application file for complete search history.

(56) References Cited

U.S. PATENT DOCUMENTS

| | | |
|---|---|---|
| 7,418,082 B2 | 8/2008 | Levene et al. |
| 7,450,683 B2 | 11/2008 | Tkaczyk et al. |
| 7,486,764 B2 | 2/2009 | Tkaczyk et al. |
| 2004/0057556 A1 | 3/2004 | Luhta et al. |
| 2006/0086913 A1 | 4/2006 | Spahn |
| 2006/0153328 A1 | 7/2006 | Schlomka et al. |
| 2014/0355734 A1 | 12/2014 | Ying |
| 2015/0069252 A1 | 3/2015 | Eichenseer |
| 2015/0179291 A1 | 6/2015 | Yu |
| 2015/0234058 A1* | 8/2015 | Engel ................ G01T 1/241 250/370.08 |

(Continued)

FOREIGN PATENT DOCUMENTS

| | | |
|---|---|---|
| WO | 2009/042827 A1 | 4/2009 |
| WO | 2016/091760 A1 | 6/2016 |

OTHER PUBLICATIONS

Shikhaliev, Polad M.; "Tilted Angle CZT Detector for Photon Counting/Energy weighting X-Ray and CT Imaging", Iopscience, vol. 51, No. 17, Aug. 15, 2006.

(Continued)

*Primary Examiner* — David P Porta
*Assistant Examiner* — Gisselle M Gutierrez
(74) *Attorney, Agent, or Firm* — GE Global Patent Operation; Pabitra Chakrabarti (57) ABSTRACT

The present approach relates to the use of reference pixels provided between the primary pixels of a detector panel. Coincidence circuitry or logic may be employed so that the measured signal arising from the same X-ray event may be properly, that is the signal measured at both a reference and primary pixel may be combined so as to provide an accurate estimate of the measured signal, at an appropriate location on the detector panel.

20 Claims, 9 Drawing Sheets

(56) References Cited

U.S. PATENT DOCUMENTS

2016/0084968 A1\* 3/2016 Blevis .................. G01T 1/18
 250/371
2016/0245934 A1 8/2016 Shahar et al.

OTHER PUBLICATIONS

Anti-Scatter X-Ray Collimators, Nuclear Fields, 2013.
Kappler, S., et al.; Photon Counting CT at Elevated X-ray Tube Currents: Contrast Stability, Image Noise and Multi-Energy Performance, Medical Imaging 2014: Physics of Medical Imaging, vol. 9033, Feb. 15, 2014.
Kappler, S., et al., "First results from a hybrid prototype CT scanner for exploring benefits of quantum-counting in clinical CT," Proc. SPIE 8313, pp. 1-3 (Mar. 2, 2012) (Abstract).
Weidinger, T., et al., "Investigation of ultra low-dose scans in the context of quantum counting clinical CT," Proceedings of SPIE—The International Society for Optical Engineering, pp. 1-10 (Feb. 2012).
International Search Report and Written Opinion issued in connection with corresponding PCT Application No. PCT/US2018/013263 dated May 9, 2018.
Fu, G., et al., Coincidence-enabling photon-counting detector, GE co-pending U.S. Appl. No. 15/425,800, filed Feb. 6, 2017.
Rui, X., et al., Reference detector elements in conjunction with an anti-scatter collimator, GE co-pending U.S. Appl. No. 15/589,412, filed May 8, 2017.

\* cited by examiner

PIXEL-DESIGN FOR USE IN A RADIATION DETECTOR

STATEMENT REGARDING FEDERALLY SPONSORED RESEARCH & DEVELOPMENT

This invention was made with Government support under contract number 1UO1EB017140-01A1 awarded by National Institutes of Health. The Government has certain rights in the invention.

BACKGROUND

The subject matter disclosed herein relates generally to the use of semiconductor-based radiation detectors.

Non-invasive imaging technologies allow images of the internal structures or features of a subject (patient, manufactured good, baggage, package, or passenger) to be obtained non-invasively. In particular, such non-invasive imaging technologies rely on various physical principles, such as the differential transmission of X-rays through the target volume or the reflection of acoustic waves, to acquire data and to construct images or otherwise represent the internal features of the subject.

For example, in X-ray-based imaging technologies, X-ray radiation spans a subject of interest, such as a human patient, and a portion of the radiation impacts a detector where the intensity data is collected. In digital X-ray systems, a detector produces signals representative of the amount or intensity of radiation impacting discrete pixel regions of a detector surface. The signals may then be processed to generate an image that may be displayed for review.

In one such X-ray-based technique, known as computed tomography (CT), a scanner may project fan-shaped or cone-shaped X-ray beams from an X-ray source at numerous view angle positions about an object being imaged, such as a patient. The X-ray beams are attenuated as they traverse the object and are detected by a set of detector elements which produce signals representing the intensity of the incident X-ray intensity on the detector. The signals are processed to produce data representing the line integrals of the linear attenuation coefficients of the object along the X-ray paths. These signals are typically called "projection data" or just "projections". By using reconstruction techniques, such as filtered backprojection, images may be generated that represent a volume or a volumetric rendering of a region of interest of the patient or imaged object. In a medical context, pathologies or other structures of interest may then be located or identified from the reconstructed images or rendered volume.

Radiation detectors used in these types of imaging techniques may operate in an energy-integrating mode (i.e., readout of the total integrated energy deposited during an acquisition interval) or a photon-counting mode (each individual X-ray photon is detected and counted). Energy integration is the conventional mode for X-ray detectors in most clinical applications. However, photon-counting detectors offer other benefits relative to energy-integrating detectors, such as improved resolution, the ability to improve contrast-to-noise ratio by optimally weighting detected photons, the ability to better delineate materials in the X-ray beam, and so on. Photon-counting detectors may also, depending on their implementation, provide energy-discriminating functionality, such that each photon detected may be characterized or "binned" based on its observed energy.

Radiation detectors typically operate based on two different physical principles. Certain detectors employ a scintillating intermediary which, in response to X-ray events emits optical photons at the location of the X-ray event. The optical photons may then be detected and localized using known photodetection techniques. Alternatively, a detector may employ direct-conversion of incident X-rays to electrical signals, such as a detector based on silicon strips or other semiconductor materials (such as cadmium zinc telluride (CZT) or cadmium telluride (CdTe)) that generate a measurable signal when the semiconductor substrate is itself exposed to X-ray photons. One issue that can arise in such direct-conversion contexts, however, is the charge cloud associated with a conversion event may span multiple detector pixels, which can lead to erroneous measurements.

BRIEF DESCRIPTION

In one embodiment, a radiation detector assembly is provided. In accordance with this embodiment, the radiation detector assembly includes: an array of primary pixels and an array of reference pixels. Each reference pixel is adjacent to at least one primary pixel. The radiation detector assembly also includes detection circuitry in communication with the array of primary pixels and the array of reference pixels. The detection circuitry is configured to detect signals in the primary pixels and the reference pixels that are coincident in time.

In a further embodiment, a method for detecting and correcting for a charge-sharing event in a radiation detector is provided. In accordance with this embodiment, the method includes reading out signals from an array of primary pixels and an array of reference pixels. Each reference pixel is adjacent to at least one primary pixel. A signal read out from a respective reference pixel is detected. Coincidence logic is executed to identify a respective primary pixel adjacent to the respective reference pixel in which a corresponding signal was read out. The signal from the respective reference pixel and the corresponding signal are combined.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

While the following discussion is generally provided in the context of medical imaging, it should be appreciated that the present techniques are not limited to such medical contexts. Indeed, the provision of examples and explanations in such a medical context is only to facilitate explanation by providing instances of real-world implementations and applications. However, the present approaches may also be utilized in other contexts, such as the non-destructive inspection of manufactured parts or goods (i.e., quality-control or quality-review applications), and/or the non-invasive inspection of packages, boxes, luggage, and so forth (i.e., security or screening applications). In general, the present approaches may be desirable in any imaging or screening context in which energy discrimination in a photon-counting context is desirable.

As discussed herein, the present approach relates to the use of reference or "sharing" pixels provided between the primary (i.e., active or readout) pixels of a semi-conductor (i.e., direct conversion) type detector panel, such as a CZT-, CdTe-, or silicon-based detector. In particular, the reference pixels may be sized so as to prevent a typical charge cloud from overlapping two primary pixels. Coincidence circuitry or logic may also be employed so that the measured signal arising from the same X-ray event may be properly associated such that signal measured at both a reference and primary pixel may be combined (e.g., summed) so as to provide an accurate measured signal at an appropriate location on the detector panel. In this manner spectral correction of charge-sharing events may be implemented.

In addition, as discussed herein, in certain implementations, the measured signals of the sharing or reference pixels may be used to localize a measured signal to something less than a full primary pixel, i.e., to a sub-pixel resolution. For example, based on a detection event at a particular reference pixel, an X-ray event at an adjacent primary pixel may be localized to a spatial sub-region of the primary pixel. In this manner, sub-pixel spatial resolutions may be obtained.

In certain implementations where an anti-scatter collimator is employed, the present approach may be useful in that the reference pixels may be generally positioned in the area under the anti-scatter collimator, which typically is shielded from X-ray photon events. In this manner, the reference pixels may be used to obtain additional spatial and energy information attributable to charge-sharing events. The area under the anti-scatter-collimator, therefore, can be used to obtain useful signal, as opposed to being dead space on the detector panel.

Figure 1:
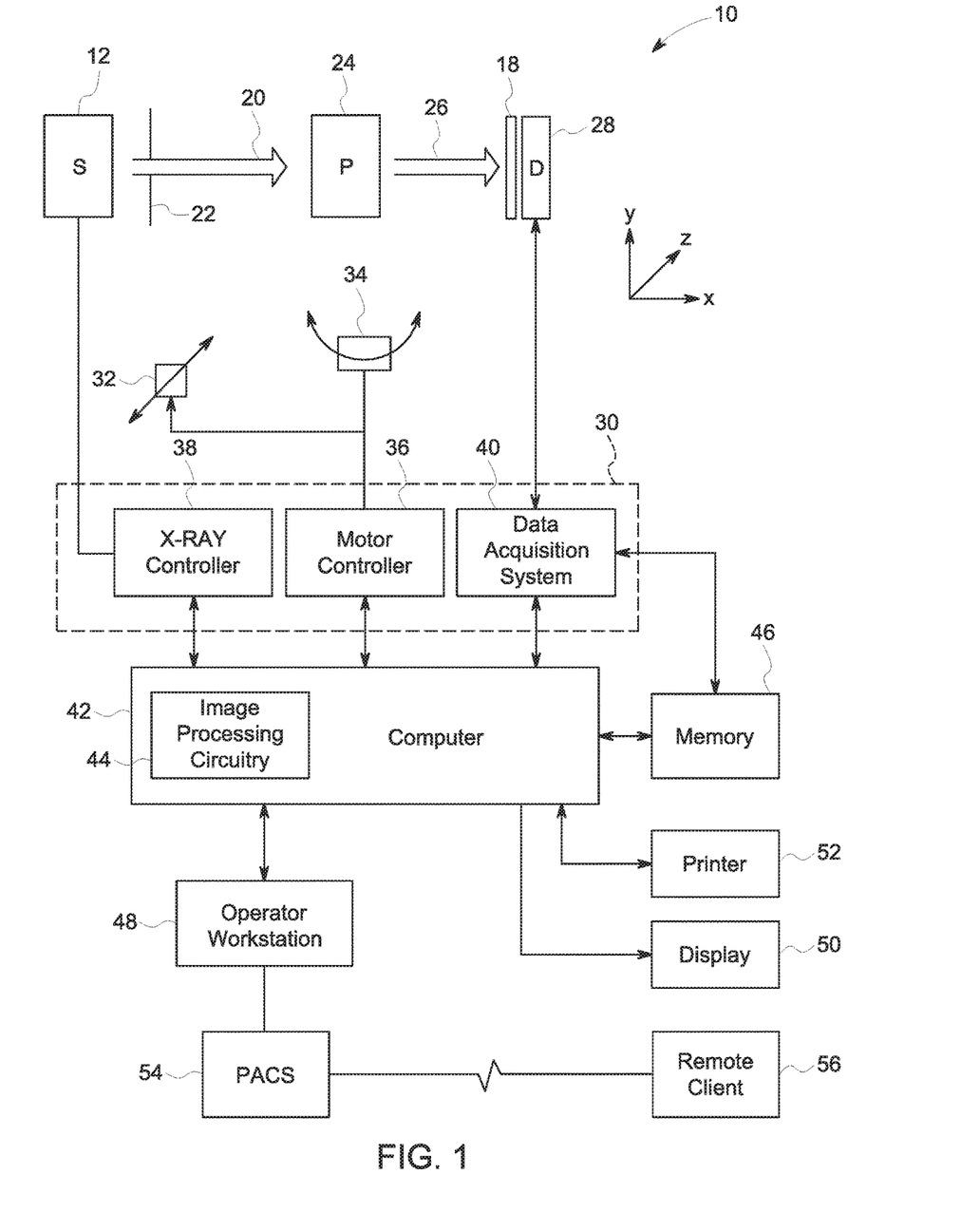
FIG. 1 is a schematic illustration of an embodiment of a computed tomography (CT) system configured to acquire CT images of a patient and process the images in accordance with aspects of the present disclosure.

With the preceding discussion in mind, FIG. 1 illustrates an embodiment of an imaging system 10 for acquiring and processing image data using reference or (i.e., "sharing") pixels positioned between primary (i.e., readout or active) pixels, in accordance with structures and approaches discussed herein. In the illustrated embodiment, system 10 is a computed tomography (CT) system designed to acquire X-ray projection data and to reconstruct the projection data into volumetric reconstructions for display and analysis. The CT imaging system 10 includes one or more X-ray sources 12, such as one or more X-ray tubes or solid state emission structures which allow X-ray generation at one or more energy spectra during the course of an imaging session.

In certain implementations, the source 12 may be positioned proximate to a filter assembly or beam shaper 22 that may be used to steer the X-ray beam 20, to define the shape and/or extent of a high-intensity region of the X-ray beam 20, to control or define the energy profile of the X-ray beam 20, and/or to otherwise limit X-ray exposure on those portions of the patient 24 not within a region of interest. In practice, the filter assembly or beam shaper 22 may be incorporated within the gantry, between the source 12 and the imaged volume.

The X-ray beam 20 passes into a region in which the subject (e.g., a patient 24) or object of interest (e.g., manufactured component, baggage, package, and so forth) is positioned. The subject attenuates at least a portion of the X-rays 20, resulting in attenuated X-rays 26 that impinge upon a detector array 28 formed by a plurality of detector elements (e.g., pixels) as discussed herein. The detector 28 may be an energy-integrating detector, a photon-counting detector, an energy-discriminating detector, or any other suitable radiation detector. By way of example, the detector 28 may be an energy-discriminating photon-counting detector, whose outputs convey information about the number and energy of photons that impact the detector at measured positions and over a time interval corresponding to a scan or imaging session. In one embodiment, the detector 28 may be a direct-conversion type detector (i.e., a detector that does not employ a scintillator intermediary), such as a detector based on CZT, CdTe, or silicon semiconductor materials that generate a measurable signal when the semiconductor substrate is itself exposed to X-ray photons.

In the depicted example, the detector 28 is adjacent or otherwise proximate to an anti-scatter collimator 18 that is typically made of a material that absorbs or otherwise blocks X-ray photons. Thus, X-rays striking the septa of the anti-scatter collimator 18, such as being reflected, deflected, or otherwise moving at an angle relative to the septa of the anti-scatter collimator 18, are prevented from reaching the detector 28. Conversely, X-ray photons traveling in a relatively straight path from the X-ray source 12 are unimpeded by the anti-scatter collimator 18 and reach the detector 28. For the purpose of discussion herein, the detector 28 may in certain instances be referred to as being beneath or in the "shadow" of the anti-scatter collimator 18 as seen from the perspective of the X-ray source 12. Such characterization denotes a relationship in which the collimator 18 is always between the X-ray source 12 and detector 28 and the X-ray source 12 is viewed (regardless of actual orientation or position) as being "up" and a source of X-ray illumination. As will be appreciated, however, such characterization does not necessarily denote absolute position or orientation information.

With respect to the detector 28, as discussed herein the detector 28 typically defines an array of detector elements, each of which produces an electrical signal when exposed to X-ray photons. The electrical signals are acquired and processed to generate one or more projection datasets. In the depicted example, the detector 28 is coupled to the system controller 30, which commands acquisition of the digital signals generated by the detector 28.

A system controller 30 commands operation of the imaging system 10 to execute filtration, examination and/or calibration protocols, and may process the acquired data. With respect to the X-ray source 12, the system controller 30 furnishes power, focal spot location, control signals and so forth, for the X-ray examination sequences. In accordance with certain embodiments, the system controller 30 may control operation of the filter assembly 22, the CT gantry (or other structural support to which the X-ray source 12 and detector 28 are attached), and/or the translation and/or inclination of the patient support over the course of an examination.

In addition, the system controller 30, via a motor controller 36, may control operation of a linear positioning subsystem 32 and/or a rotational subsystem 34 used to move the subject 24 and/or components of the imaging system 10, respectively. The system controller 30 may include signal processing circuitry and associated memory circuitry. In such embodiments, the memory circuitry may store programs, routines, and/or encoded algorithms executed by the system controller 30 to operate the imaging system 10, including the X-ray source 12 and/or filter assembly 22, and to process the digital measurements acquired by the detector 28 in accordance with the steps and processes discussed herein. In one embodiment, the system controller 30 may be implemented as all or part of a processor-based system.

The source 12 may be controlled by an X-ray controller 38 contained within the system controller 30. The X-ray controller 38 may be configured to provide power, timing signals, and/or focal size and spot locations to the source 12. In addition, in some embodiments the X-ray controller 38 may be configured to selectively activate the source 12 such that tubes or emitters at different locations within the system 10 may be operated in synchrony with one another or independent of one another or to switch the source between different energy profiles during an imaging session.

The system controller 30 may include a data acquisition system (DAS) 40. The DAS 40 receives data collected by readout electronics of the detector 28, such as digital signals from the detector 28. The DAS 40 may then convert and/or process the data for subsequent processing by a processor-based system, such as a computer 42. In certain implementations discussed herein, circuitry within the detector 28 may convert analog signals of the detector to digital signals prior to transmission to the data acquisition system 40. The computer 42 may include or communicate with one or more non-transitory memory devices 46 that can store data processed by the computer 42, data to be processed by the computer 42, or instructions to be executed by image processing circuitry 44 of the computer 42. For example, a processor of the computer 42 may execute one or more sets of instructions stored on the memory 46, which may be a memory of the computer 42, a memory of the processor, firmware, or a similar instantiation.

The computer 42 may also be adapted to control features enabled by the system controller 30 (i.e., scanning operations and data acquisition), such as in response to commands and scanning parameters provided by an operator via an operator workstation 48. The system 10 may also include a display 50 coupled to the operator workstation 48 that allows the operator to view relevant system data, imaging parameters, raw imaging data, reconstructed data (e.g., soft tissue images, bone images, segmented vascular trees, and so on), material basis images, and/or material-decomposition results, and so forth. Additionally, the system 10 may include a printer 52 coupled to the operator workstation 48 and configured to print any desired measurement results. The display 50 and the printer 52 may also be connected to the computer 42 directly (as shown in FIG. 1) or via the operator workstation 48. Further, the operator workstation 48 may include or be coupled to a picture archiving and communications system (PACS) 54. PACS 54 may be coupled to a remote system or client 56, radiology department information system (RIS), hospital information system (HIS) or to an internal or external network, so that others at different locations can gain access to the image data.

With the preceding discussion of an overall imaging system 10 in mind, the present approaches relate to the use of reference pixels, also referred to a sharing pixels herein, situated between the primary or readout pixels of the detector 28. In order to discuss the present approach, it may be useful to initially describe the occurrence of charge sharing in a conventional solid state detector. By way of example, turning to FIG. 2, a conventional detector panel 28B is depicted having primary pixel electrodes 70 which collect the charge signal generated in response to X-ray photons 72 (shown traveling toward the detector 28B along dashed arrows) absorbed in the semiconductor sensor material 90. Each X-ray interaction with the sensor material 90 may be associated with a charge cloud 74 that originates from the corresponding X-ray photon 72 interaction.

Figure 2:
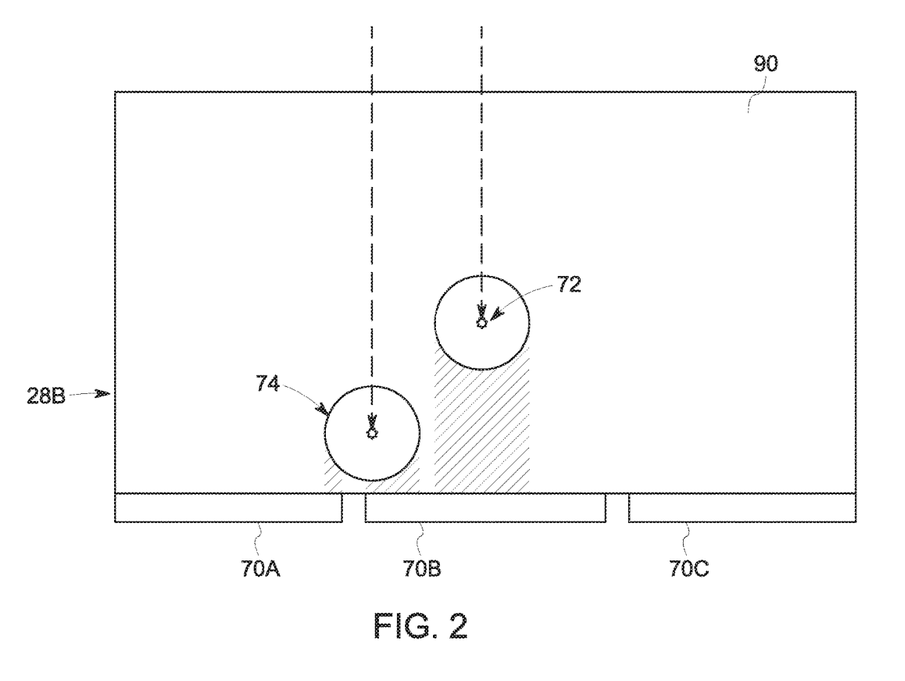
FIG. 2 depicts a side view of a conventional pixel arrangement.

The charge clouds are transported under the influence of an electric field from the site of photon absorption in the bulk of the sensor material 90 to the electrodes 70 on the surface of the sensor. These electrodes define the extent of each individual pixel. The proportion of charge ultimately collected by each electrode (pixel) is determined by the amount of the charge that overlaps each electrode when the charge reaches the electrodes. In this way a charge cloud may be split or be shared between multiple pixels 70. In this example, the rightmost X-ray photon will interact with pixel 70B away from an edge, and the resulting signal will therefore be registered only in pixel 70B. Conversely, the leftmost X-ray photon 72 will interact with pixel 70B along an edge, and the resulting charge cloud 74 will overlap between pixels 70A and 70B. The second scenario results in what is called charge sharing. In the pulse height analysis to collect the energy spectrum, charge sharing creates the appearance of two separate X-rays, whose energy approximately sums to the actual X-ray energy. Thus, a single event is read as two separate events, each having a fraction of the energy of the true single event, if properly registered.

Figure 3:
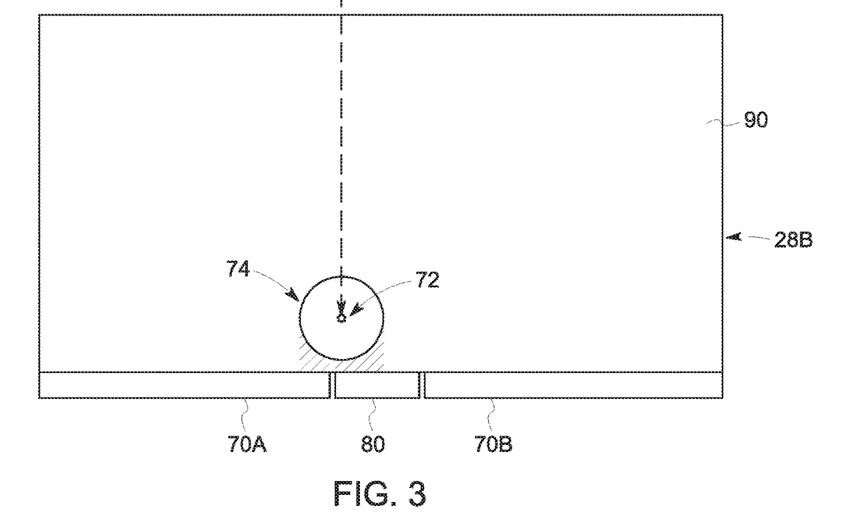
FIG. 3 depicts a side view of reference and primary pixels in the context of an overlapping charge cloud, in accordance with aspects of the present disclosure.
Figure 4:
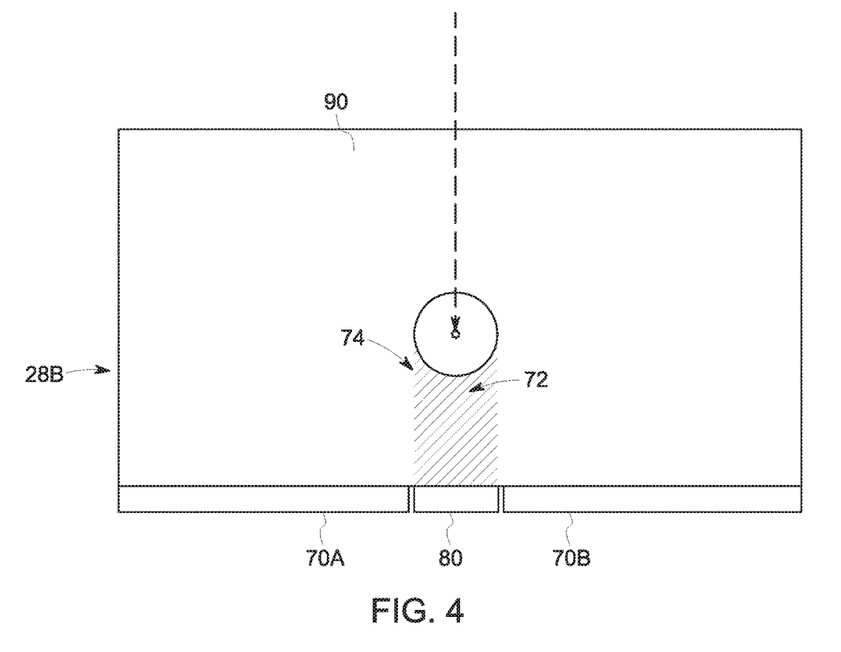
FIG. 4 depicts a side view of reference and primary pixels in the context of a charge cloud centered on the reference pixel, in accordance with aspects of the present disclosure.

Turning now to FIGS. 3 and 4, in accordance with aspects of the present approach, a reference pixel 80 is positioned between each pair of primary pixels 70. In this example, the reference pixel 80 has smaller area on the surface of the detector 28. In accordance with one implementation, the reference pixels 80 are sized so as to approximate the size of a charge cloud 74. That is, in this example, the width of the reference pixel 80 may correspond to, or slightly exceed, a known or average diameter (e.g., approximately 50 μm) of a charge cloud 74 as is generated in a given imaging (e.g., X-ray) application. As a result, except for rare cases in which an X-ray interacts with the center of a reference pixel 80 (as shown in FIG. 4), a charge-sharing event, in a given dimension, will typically (as shown in FIG. 3) be between a reference pixel 80 and adjacent primary pixel 70, but not between two neighboring primary pixels (e.g., pixels 70A and 70B).

Figure 5:
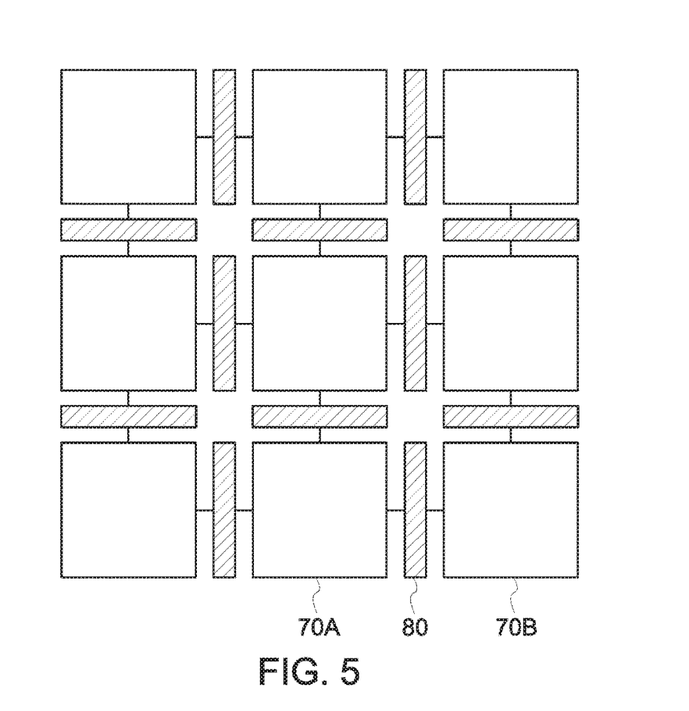
FIG. 5 depicts a top view of a two-dimensional arrangement of reference and primary pixels, in accordance with aspects of the present disclosure.

Further explanation of the arrangement of reference pixels 80 and primary pixels 70 may benefit from a top view. By way of example, and turning to FIG. 5, one possible arrangement of reference pixels 80 and primary pixels 70 in a two-dimensional array is shown. Each reference pixel 80 has exactly two primary pixels 70 as adjacent neighbors in this example.

Figure 6:
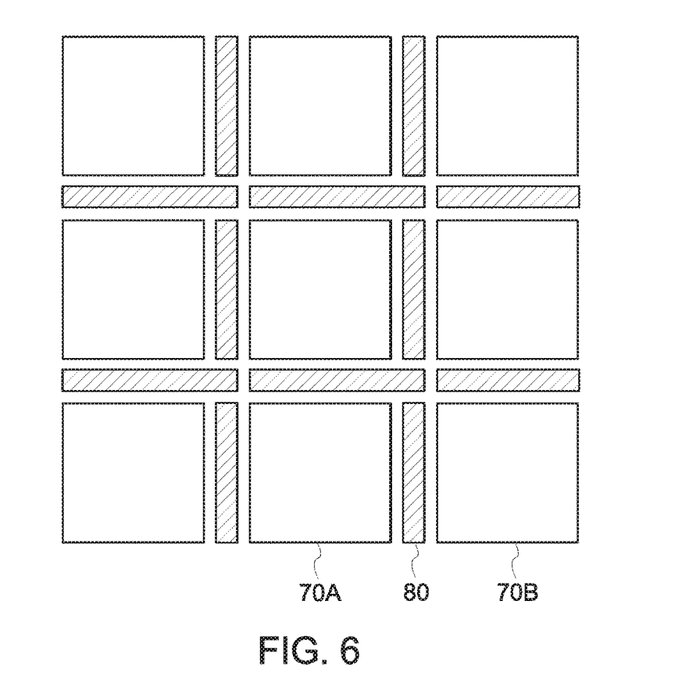
FIG. 6 depicts a top view of a further two-dimensional arrangement of reference and primary pixels, in accordance with aspects of the present disclosure.
Figure 7:
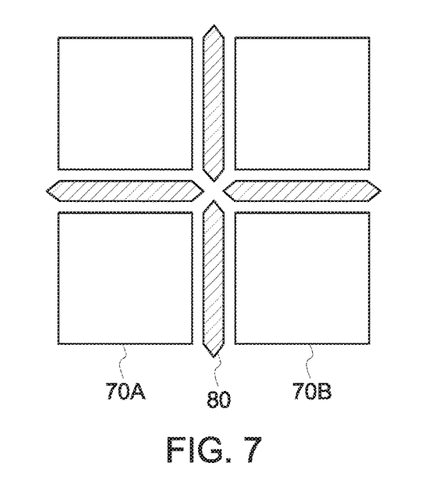
FIG. 7 depicts a top view of an additional two-dimensional arrangement of reference and primary pixels, in accordance with aspects of the present disclosure.

Turning to FIGS. 6 and 7, in these examples reference pixels 80 are shaped and/or sized so as to maximize the total fill factor. By way of example, FIG. 6 depicts an example where reference pixels 80 in one dimension are sized so as to extend into and substantially fill the intersection region between pixels. Likewise, in FIG. 7 an example is provided whereby the reference pixels 80 are so shaped such that each extends partially into the intersection region so that, in combination, the reference pixels substantially fill the intersection region.

Figure 8:
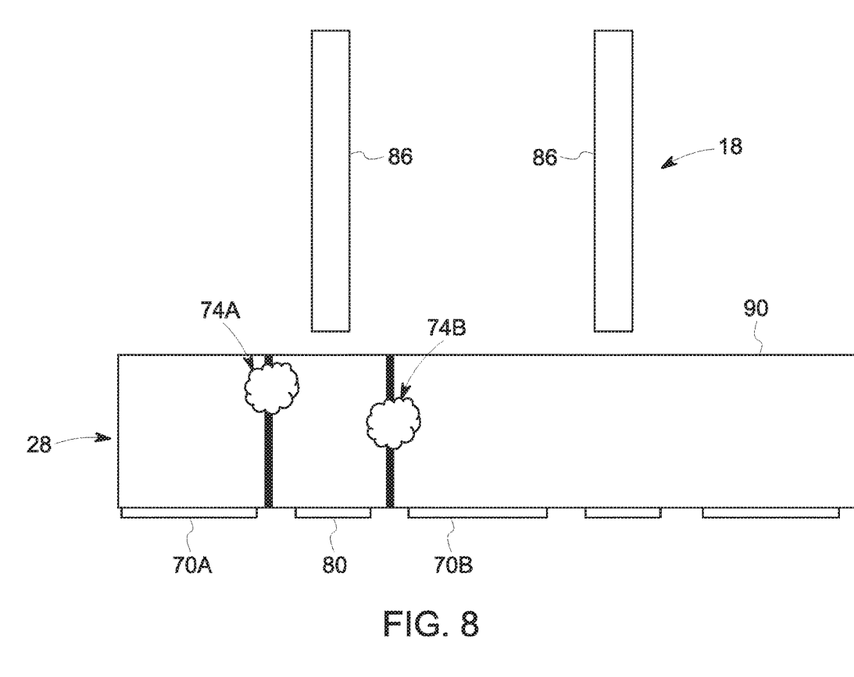
FIG. 8 depicts a side view of reference and primary pixels with an anti-scatter collimator, in accordance with aspects of the present disclosure.

Turning to FIG. 8, an example of an implementation provided in conjunction with an anti-scatter collimator 18 is provided. In such a configuration, the area of the detector 28 beneath the anti-scatter collimator 18 would conventionally not generate useful signal due to the collimator 18 blocking X-ray photons, and thereby preventing primary X-ray events in the shielded regions of the detector. As a result, in conventional approaches the area of the detector 28 beneath the ant-scatter collimator might be deactivated as dead space on the detector panel 28.

However, in certain implementations of the present approach, the reference pixels 80 are generally situated beneath the septa 86 of the anti-scatter collimator 18. Depending on the implementation, the width of the reference pixels 80 may be equivalent to or slightly larger than the corresponding width of the respective septa 18. As a general rule, however, the reference pixels 80 are sized so as to prevent a charge-sharing event from occurring on two proximate primary pixels 70, and hence will typically have a width at least corresponding to the diameter of an expected charge-sharing event. That is, the reference pixels 80 are sized so that when X-ray photons are detected, all or most of charge-sharing events are shared by pairs of the primary pixels 70 and reference pixels 80, as opposed to pairs of primary pixels. By way of example, in one implementation, the width of the primary pixels 70 (as seen from the depicted side view) may be approximately 550 μm, while the width of the reference pixels 80 (as seen from the same view) may be approximately 160 μm. In another example, a reference pixel 80 may have a width that is less than or equal to half the width of a primary pixel so that the count rate in the reference pixel is substantially less than that of the primary pixel when exposed to the same X-ray flux.

In the depicted example, X-rays interact with the semiconductor sensor 90 (e.g., silicon, CZT, or CdTe) of the detector 28, giving rise to charge clouds 74. Vertical lines are provided with respect to each charge cloud 74 so as to better visualize the relationship of a respective charge cloud 74 to the reference pixels 80 and primary pixels 70. As shown in this example, the reference pixels 80, despite being positioned beneath the septa 86 of the anti-scatter collimator 18 and thus shielded from primary X-ray interaction events, are still exposed to charge-sharing events 74.

By way of illustrating the present concepts, FIG. 8 illustrates a first charge-sharing event 74A only gives rise to signal at primary pixel 70A and reference pixel 80. Conversely, a second sharing event 74B only gives rise to signal at primary pixel 70B and reference pixel 80. Due to the presence of the corresponding septum 86, no primary X-ray interaction is likely to occur at the reference pixels 80, but charge-sharing events 74 can be properly attributed to the primary pixel 70 over which the X-ray event occurs.

As will be appreciated, charge-sharing correction as discussed herein relies not only on having access to the measured signal from each pixel on which the shared charge is present, but also being able to identify that two such signals have resulted from the same (i.e., a single) X-ray interaction with the detector sensor 90. That is, separate measured signals on an adjacent reference pixel 80 and primary pixel 70 would only be indicative of a charge-sharing event if they are determined to have occurred sufficiently close in time to one another (i.e., to be coincident in time). Coincidence between two reference pixels is not typically detected.

With that in mind one aspect of the present approach is the use of coincidence logic to identify charge-sharing events. Such logic may be implemented as part of an application specific integrated circuit (ASIC) or as routines executable by a general-purpose processor or circuit where the routines or ASIC is provided in the data readout path of the detector 28. For example, such an ASIC or routines may be provided as part of the detector 28 (such as part of the readout circuity provided on the detector itself) or downstream from the detector on the DAS or other detector control or readout component.

By way of example, such coincidence logic (whether implemented as an ASIC or executable code) may be triggered when a signal is read out from a reference pixel 80. As will be appreciated, the reference pixels 80, due to their relatively small surface area compared to a primary pixel 70 and, in some instances, due to being positioned at least partially beneath the septa of an anti-scatter collimator 18 will generate fewer counts compared to the larger, fully-exposed primary pixels 70. Thus, when an event is detected at a reference pixel 80 (as indicated by a signal being read out from the reference pixel), the coincidence logic may be triggered and will, when executed, detect which adjacent primary pixel 70 detected a corresponding event sufficiently close in time as to be attributed to the same X-ray interaction. The charge-sharing event can then be attributed to that primary pixel 70, and the appropriate signals added.

Figure 9:
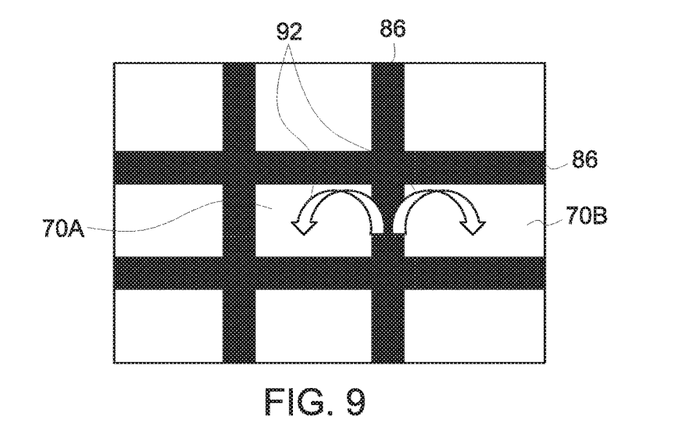
FIG. 9 depicts a top view of an anti-scatter collimator and pixels of a detector, in accordance with aspects of the present disclosure.
Figure 10:
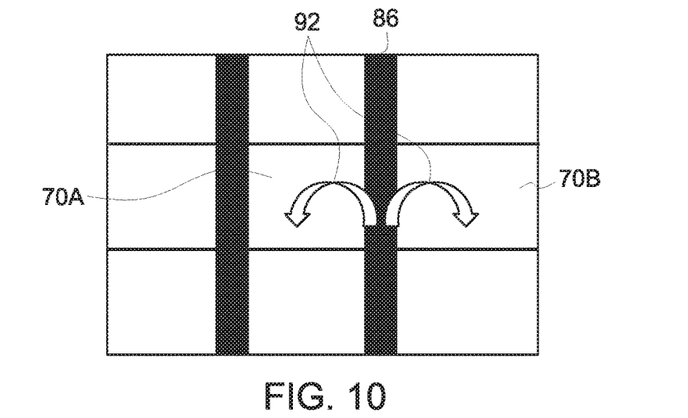
FIG. 10 depicts a top view of an alternative arrangement of an anti-scatter collimator and pixels of a detector, in accordance with aspects of the present disclosure.
Figure 11:
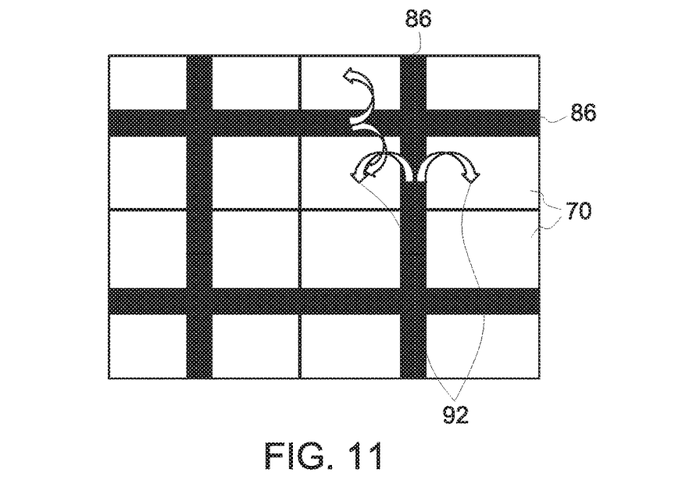
FIG. 11 depicts a top view of a further arrangement of an anti-scatter collimator and pixels of a detector, in accordance with aspects of the present disclosure.

Three high-level examples of the coincidence resolution are shown in FIGS. 9-11, which each depict a top view of an anti-scatter collimator having X-ray blocking septa 86 positioned over a detector. In these examples, the reference pixels 80 are positioned under the septa 86 and are therefore not visible. Conversely, the primary pixels 70, being positioned between the septa 70, can be seen in the top view. FIG. 9 depicts a two-dimensional (2D) anti-scatter collimator (i.e., a grid); FIG. 10 depicts a one-dimensional (1D) anti-scatter collimator; and FIG. 11 depicts a 2D anti-scatter collimator where the spaces between the septa 86 are positioned at 2×2-pixel array spacing, as opposed to a single pixel.

Turning to FIG. 9, in this example, signal detected at a given reference pixel will, based on the coincidence logic, be resolved (e.g., attributed) to one of the two adjacent primary pixels 70A or 70B, as shown by arrows 92 based on which of those primary pixels also detected an event at the same time (or sufficiently close in time) as the respective reference pixel. Though only a single coincidence determination in one-dimension is shown in FIG. 9, reference pixels running in the perpendicular dimension are also present to resolve charge-sharing events in the other dimension.

Similarly, turning to FIG. 10, in the 1D anti-scatter collimator example, in one dimension signal detected at a given reference pixel will, based on the coincidence logic, be resolved to one of the two adjacent primary pixels 70A or 70B, as shown by arrows 92 based on which of those primary pixels also detected an event at the same time (or sufficiently close in time) as the respective reference pixel. However, unlike the example of FIG. 9, the absence of septa and reference pixels in the second dimension prevent charge-sharing events from being resolved in the second dimension. That is, only two sides of each primary pixel 70 are adjacent to a reference pixel 80. Therefore, the accuracy of the correction is reduced as compared to the implementation shown in FIG. 9 since charge-sharing events can still occur between primary pixels 70. However, there is still a beneficial effect from being able to correct for those charge-sharing events that occur proximate to reference pixels.

Turning to FIG. 11, in this example the septa 86 of the anti-scatter collimator are not positioned around each individual pixel, but instead around 2×2 arrays of primary pixels 70. In this implementation, as in the 1D collimator example of FIG. 10, only two sides of each primary pixel 70 are adjacent to a reference pixel 80. Therefore, as in the preceding example, the accuracy of the correction is reduced as compared to the implementation shown in FIG. 9 since, within each 2×2 pixel array, charge-sharing events can still occur between primary pixels 70. However, there is still a beneficial effect from being able to correct for those charge-sharing events that occur proximate to reference pixels.

Figure 12:
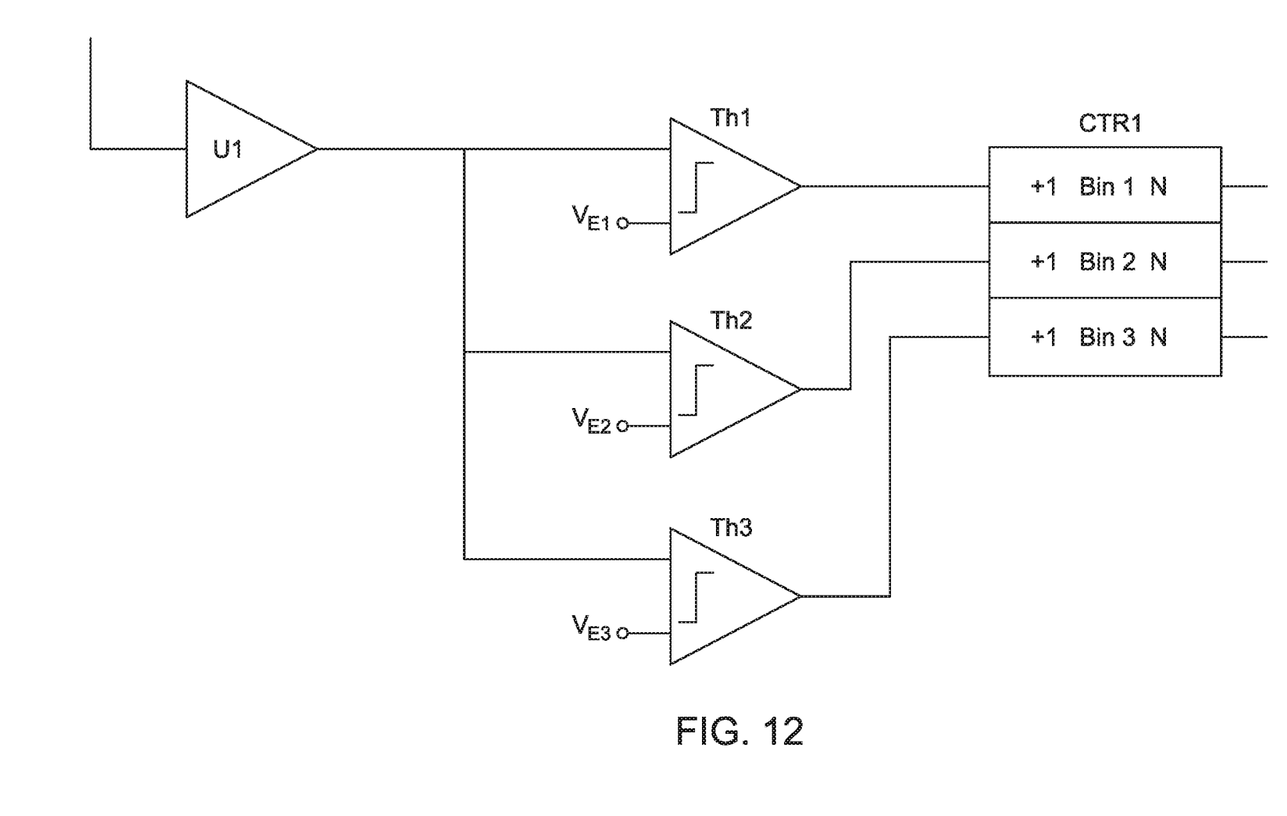
FIG. 12 depicts an example of a conventional detection circuit.

With respect to the logical and electrical implementation of coincidence detection, it may be initially useful to understand the working of a conventional photon-counting, energy-discriminating detection circuit, an example of which is shown in FIG. 12. In this example, the charge from each pixel enters a charge-sensitive amplifier, shaping circuit, and sometimes a sample-hold circuit, shown collectively as U1. The output of U1 is a voltage proportional to the amplitude of the collected charge. This voltage is routed to one or more threshold comparators (here denoted as Th1-Th3) which each compare the input voltage against a reference voltage ($V_{E1}$, $V_{E2}$ and $V_{E3}$). If the voltage exceeds the reference voltage, a digital output is activated which causes the corresponding register of the counter to increment by 1 count. In this way, the incoming charge pulses are counted according to their energies.

Figure 13:
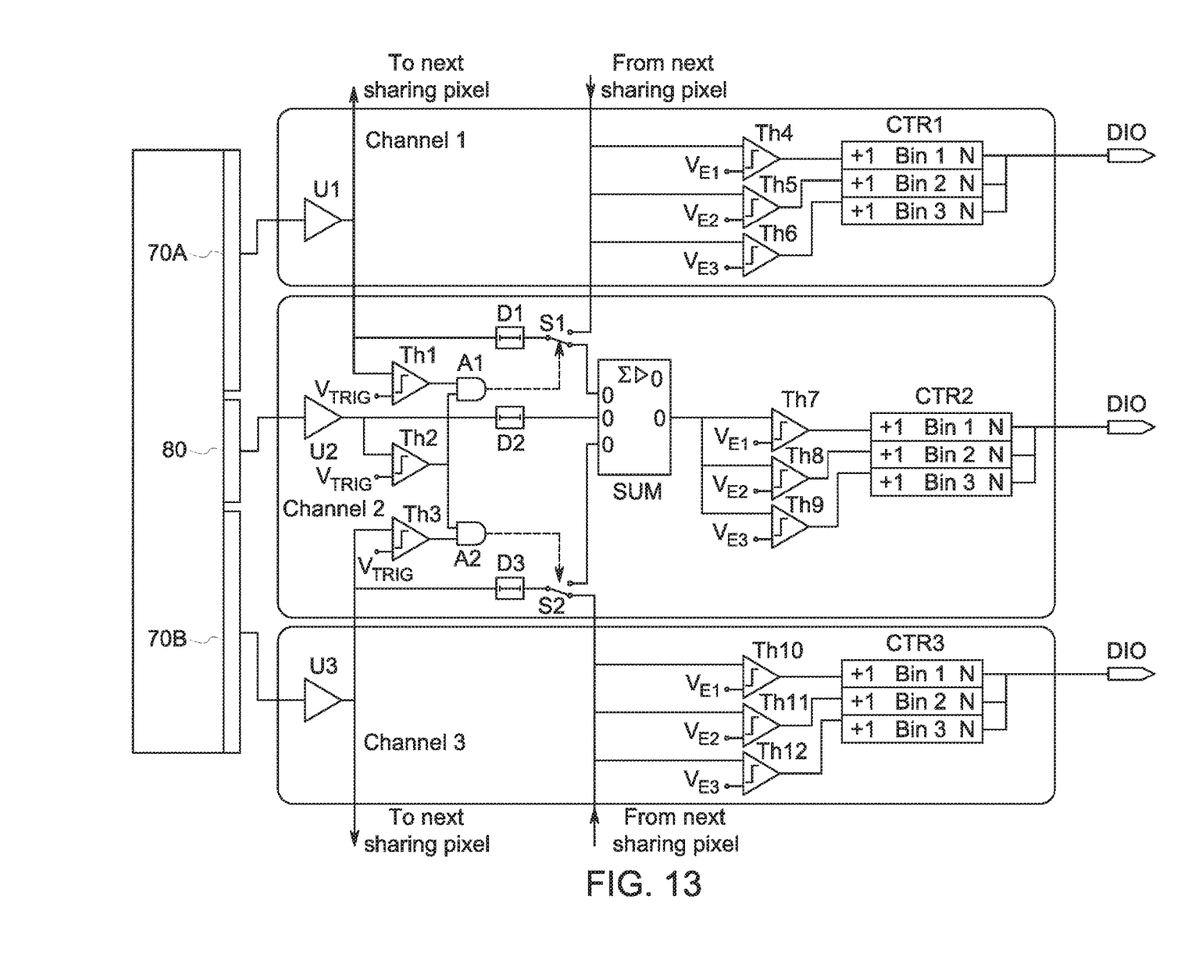
FIG. 13 depicts an example of a circuit configured to detect and correct charge sharing, in accordance with aspects of the present disclosure.

In contrast, FIG. 13 depicts a circuit capable of using the signal from a reference pixel 80 to detect and correct for the charge sharing, as discussed herein. In the illustrated example, electronics channels (channel 1-3) are assigned to pixels 70A, 80B and 70B respectively. There are two types of channels, one type for primary (i.e., conventional) pixels 70 (here channels 1 and 3) and a different type of channel for reference pixels 80 (here channel 2). In this example, all channels are equipped with an input amplifier/shaper (U1, U2, U3) and a set of energy thresholds (Th4-Th12) and associated output counters.

In the depicted example, the channel associated with the reference pixel 80 (i.e., channel 2) includes 3 triggering comparators connected to the reference pixel amplifier and its neighbors (Th1-Th3). The reference voltage for the triggering thresholds are set to a low value ($V_{TRIG}$), such that any signal above the noise floor is sufficient to trigger the comparator.

In the depicted implementation, the trigger threshold logic outputs are connected through AND gates (A1 and A2) to switches S1 and S2. If primary pixel 70A and the reference pixel 80 both trigger, then switch S1 is set to connect the output of delay D1 to the summing circuit (SUM) along with the delayed version of the reference pixel 80 signal. In this case the energy threshold for Channel 1 never triggers. The X-ray event is reported through channel 2 only. This switch setting is illustrated in FIG. 13.

If channel 1 triggers and channel 2 does not, then S1 connects D1 to the energy comparators and counters for Pixel 1. The X-ray event is reported through channel 1. The corresponding process occurs if channel 2 and 3 both trigger.

The delay circuits D1 and D3 ensure that switches S1 or S2 are set to their desired state before the analog pulse arrives from U1 or U3. Delay D2 ensures that the pulse from U2 arrives at the SUM at the same time.

While the preceding example illustrates a one-dimensional pixel array, extension to a two-dimensional array of pixels is straightforward.

In addition to charge-sharing resolution, the use of reference pixels 80 as discussed herein may also allow for sub-pixel spatial resolution. In particular, detection of a charge-sharing event 74 as discussed herein can be used to localize the event on the primary pixel. This sub-pixel spatial information could be used by the reconstruction algorithm to improve imaging resolution as a result.

Figure 14:
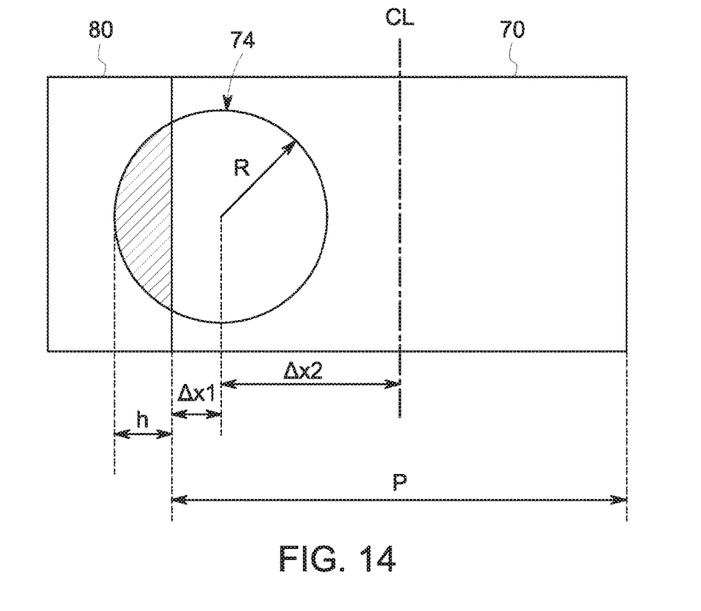
FIG. 14 depicts a schematic view of primary and reference pixel in conjunction with a charge cloud, in accordance with aspects of the present disclosure.

By way of example, the proportion of charge collected by a reference pixel 80 and the respective primary pixel 70 may be used to estimate the center position of the charge cloud 74. As shown in FIG. 14, it would be useful to estimate the distance $\Delta x2$ from the center of the primary pixel 70 (having pitch p) to the center of the charge cloud 74.

In this example, the total charge q is proportional to the energy of the X-ray. Let $q_1$ and $q_2$ be the charge collected in the reference pixel 80 and primary pixel 70 respectively. Then $$E_{tot} \propto q = q_1 + q_2. \quad (1)$$

The radius, R, of the charge cloud 74 is a function of the energy of the X-ray, or equivalently, of the total charge:

$$R = f(q). \quad (2)$$

Let $V_{tot}$ be the volume of the charge cloud 74 and $V_1$ be the volume overlapping the reference pixel 80. Then the ratio of the overlapping part to the total volume will be $$\frac{V_1}{V_{tot}} = \frac{\frac{\pi}{3}h^2(3R-h)}{\frac{4}{3}\pi R^3} = \frac{3Rh^2 - h^3}{4R^3}. \quad (3)$$

where h is the linear length of the overlap. The ratio of the charge overlapping with the reference pixel and the primary pixel, denoted as $V_1$ and $V_2$, respectively, can be written as:

$$\frac{V_1}{V_2} = \frac{\frac{\pi}{3}h^2(3R-h)}{\frac{4}{3}\pi R^3 - V_1} = \frac{3Rh^2 - h^3}{4R^3 - 3Rh^2 + h^3}. \quad (4)$$

Figure 15:
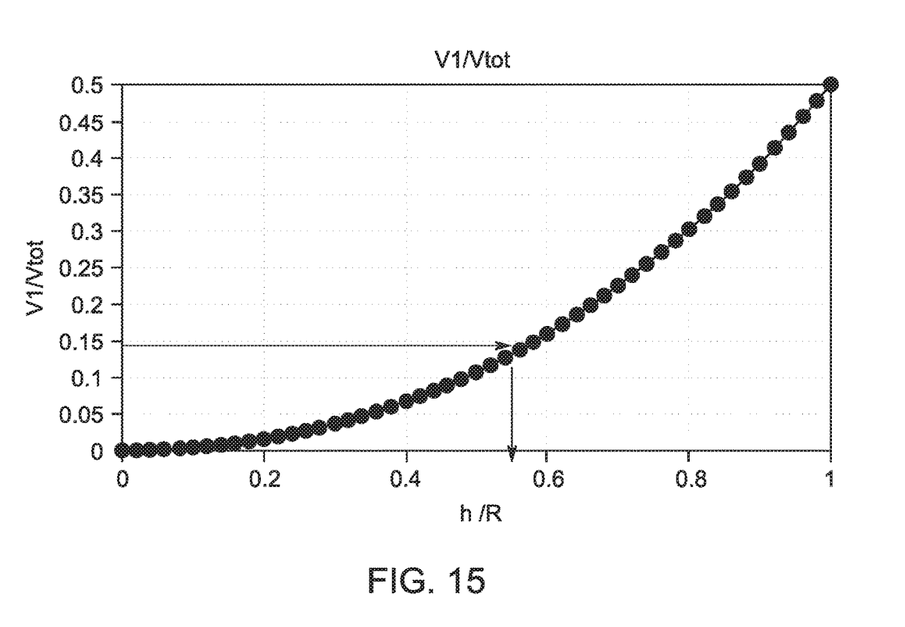
FIG. 15 depicts a plot of the charge volume ratio ($V_1/V_{tot}$) versus linear overlap length (h/R), in accordance with aspects of the present disclosure.

Turning to FIG. 15, a plot of the charge volume ratio ($V_1/V_{tot}$) versus linear overlap length (h/R) is shown. Since the ratio is single-valued, a measurement of the ratio uniquely determines h. Since R and h are known, the distance from the center of the primary pixel 70 can be calculated as:

$$\Delta x_2 = \frac{P}{2} - \Delta x_1 = \frac{P}{2} - R + h. \quad (5)$$

Technical effects of the invention include the use of reference pixels provided between the primary pixels of a semi-conductor (i.e., direct conversion) type detector panel. The reference pixels may be sized so as to prevent a typical charge cloud from overlapping two primary pixels. Coincidence circuitry or logic may also be employed so that measured signal arising from the same X-ray event may be properly associated (i.e., signal measured at both a reference and primary pixel may be combined so as to provide an accurate estimate of the measured signal) at an appropriate location on the detector panel. In this manner, spectral correction of charge-sharing events may be implemented. In addition, the measured signals of the reference pixels may be used to localize a measured signal to something less than a full primary pixel, i.e., to a sub-pixel resolution.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A radiation detector assembly comprising:
   an array of primary pixels;
   an array of reference pixels, wherein each reference pixel is adjacent to at least one primary pixel;
   detection circuitry in communication with the array of primary pixels and the array of reference pixels, wherein the detection circuitry is configured to detect signals in the primary pixels and the reference pixels that are coincident in time; and
   an anti-scatter collimator positioned over the array of reference pixels.

2. The radiation detector assembly of claim 1, wherein the anti-scatter collimator comprising X-ray attenuating septa arranged in a one-dimensional or two-dimensional geometry.

3. The radiation detector assembly of claim 1, wherein the reference pixels are smaller in area than the primary pixels.

4. The radiation detector assembly of claim 1, wherein the detection circuitry is further configured to combine signals determined to be coincident and measured in a reference pixel and a primary pixel that are adjacent to one another.

5. The radiation detector assembly of claim 4, wherein combining the signals comprises summing the signals.

6. The radiation detector assembly of claim 1, the detection circuitry is further configured to detect signals that are coincident in time in response to a signal being detected in a reference pixel.

7. The radiation detector assembly of claim 6, wherein the signal from the reference pixel exceeds a noise threshold to trigger detection of the signals that are coincident in time.

8. The radiation detector assembly of claim 1, wherein width of the reference pixels is less than or equal to half width of the primary pixels such that a count rate in the reference pixels is substantially less than a count rate in the primary pixels when exposed to same flux of X-rays.

9. The radiation detector assembly of claim 1, wherein width of the reference pixels corresponds to diameter of a charge cloud induced by X-ray interaction with a semiconductor sensor of the radiation detector assembly.

10. The radiation detector assembly of claim 1, wherein the detection circuitry is configured to associate an output signal of the detection circuitry with a respective reference pixel or a respective primary pixel depending on whether the coincident signals are detected.

11. The radiation detector assembly of claim 1, wherein the detection circuitry comprises a first type of channel for the primary pixels and a second type of channel for the reference pixels.

12. The radiation detector assembly of claim 1, wherein the detection circuitry comprises a respective channel for each primary pixel and each reference pixel, and wherein each channel comprises at least one threshold comparator and an associated digital counter, and wherein the detection circuitry is configured to increment the digital counter when an X-ray-induced signal exceeds a threshold of the respective comparator.

13. The radiation detector assembly of claim 1, wherein the detection circuitry comprises a respective channel for each primary pixel and each reference pixel, and wherein each channel comprises a peak detection circuit and an analog-to-digital converter configured to output a digital signal representative of an X-ray-induced signal.

14. The radiation detector assembly of claim 1, wherein the detection circuitry is configured to produce sub-pixel spatial resolution by combining signals from a respective primary pixel and an adjacent reference pixel to produce an output representative of relative position of an absorbed X-ray between the respective primary pixel and the adjacent reference pixel.

15. The radiation detector assembly of claim 14, wherein the relative position of the absorbed X-ray is determined based on a proportion of the signals induced in the respective primary pixel and the adjacent reference pixel.

16. A method for detecting and correcting a charge-sharing event in a radiation detector, comprising:
   reading out signals from an array of primary pixels and an array of reference pixels, wherein each reference pixel is adjacent to at least one primary pixel, and wherein the array of reference pixels is positioned under an anti-scatter collimator;
   detecting a signal read out from a respective reference pixel;
   executing coincidence logic to identify a respective primary pixel adjacent to the respective reference pixel in which the corresponding signal was read out; and
   combining the signal from the respective reference pixel and the corresponding signal.

17. The method of claim 16, wherein the reference pixels are smaller in area than the primary pixels.

18. The method of claim 16, wherein combining the signal and the corresponding signal comprises summing the signal and the corresponding signal.

19. The method of claim 16, wherein detecting the signal read out from the respective reference pixel comprises comparing the signal to a noise threshold.

20. The method of claim 16, further comprising determining a sub-pixel spatial resolution based on a proportion of the signal to the corresponding signal.

* * * * *